United States Patent
Wajs

(10) Patent No.: US 7,116,892 B2
(45) Date of Patent: Oct. 3, 2006

(54) SYSTEM FOR PROVIDING SCRAMBLED CONTENT, AND SYSTEM FOR DESCRAMBLING SCRAMBLED CONTENT

(75) Inventor: Andrew Augustine Wajs, Haarlem (NL)

(73) Assignee: Irdeto Access B.V., Hoofddorp (NL)

( * ) Notice: Subject to any disclaimer, the term of this patent is extended or adjusted under 35 U.S.C. 154(b) by 221 days.

(21) Appl. No.: 10/257,219

(22) PCT Filed: Mar. 21, 2001

(86) PCT No.: PCT/EP01/03186

§ 371 (c)(1),
(2), (4) Date: Feb. 19, 2003

(87) PCT Pub. No.: WO01/78387

PCT Pub. Date: Oct. 18, 2001

(65) Prior Publication Data

US 2003/0152364 A1    Aug. 14, 2003

(30) Foreign Application Priority Data

Apr. 7, 2000  (EP) .................................. 00201277

(51) Int. Cl.
*H04N 5/93* (2006.01)
*H04N 7/167* (2006.01)
*G11B 15/04* (2006.01)

(52) U.S. Cl. .................. 386/94; 380/228; 380/239; 725/31; 360/60

(58) Field of Classification Search .................. 386/94, 386/1, 68–70; 380/200, 216, 238–240, 4, 380/211, 280; 360/60
See application file for complete search history.

(56) References Cited

U.S. PATENT DOCUMENTS 4,775,901 A * 10/1988 Nakano ........................ 360/60

(Continued)

FOREIGN PATENT DOCUMENTS

EP    0577365 A2    1/1994
EP    0773681 A2    5/1997

OTHER PUBLICATIONS

"European Search Report for European Patent Office Application No. EP 00 20 1277", (Aug. 29, 2000), 2 pgs.

(Continued)

*Primary Examiner*—Thai Tran
*Assistant Examiner*—Jamie J Vent
(74) *Attorney, Agent, or Firm*—Schwegman, Lundberg, Woessner & Kluth, P.A.

(57) ABSTRACT

A system for providing scrambled content, comprising a control word generator, each control word including a control word identifier, a scrambler for providing a stream of scrambled data packets, and an encryption device for providing entitlement control messages (ECM's). One or more consecutive packets are scrambled using the same control word (CW). Each packet includes a control word identifier identifying the control word used. The ECM encryption device provides ECM's including a previous control word ($CW_P$), a current control word ($CW_C$) and a next control word ($CW_N$). A system for descrambling scrambled content comprises a descrambler for descrambling the scrambled content and a decryption device for decrypting ECM's to obtain control words. The ECM decryption device delivers control words to the descrambler and the descrambler descrambles the data packets of the scrambled content using a control word having a control word identifier corresponding with the control word identifier of the data packet to be descrambled. The system further comprises a storage device for storing scrambled content and means to control play back of the stored content, going fast forward and going backwards. The system is programmed to extract ECM's and to provide the ECM's to the ECM decryption device for decryption. The system is programmed to request the ECM decryption device to provide at least a next control word ($CW_N$) at play back or going fast forward, and to provide at least a previous control word ($CW_P$) and a current control word ($CW_C$) at going backwards.

3 Claims, 2 Drawing Sheets

ECM
stream content
transport
stream

U.S. PATENT DOCUMENTS

| | | | | |
|---|---|---|---|---|
| 5,832,084 A | * | 11/1998 | Park | 380/203 |
| 5,844,595 A | * | 12/1998 | Blatter et al. | 455/83 |
| 6,035,038 A | * | 3/2000 | Campinos et al. | 380/228 |
| RE37,052 E | * | 2/2001 | Park | 380/203 |
| 6,560,340 B1 | * | 5/2003 | Akins et al. | 380/239 |
| 6,725,459 B1 | * | 4/2004 | Bacon | 725/31 |
| 6,766,451 B1 | * | 7/2004 | Van Rijnsoever | 713/160 |

OTHER PUBLICATIONS

"International Search Report for PCT Application No. PCT/EP 01/03186", (Aug. 5, 2002), 1 pg.

"Smart Cards", *Scientific American,* http:www.sciam.com/0896issue/0896fancer.html,(Aug. 1996), 12 pgs.

"Functional model of a conditional access system" EBU Project Group B/CA Winter 1995 14 pages.

* cited by examiner

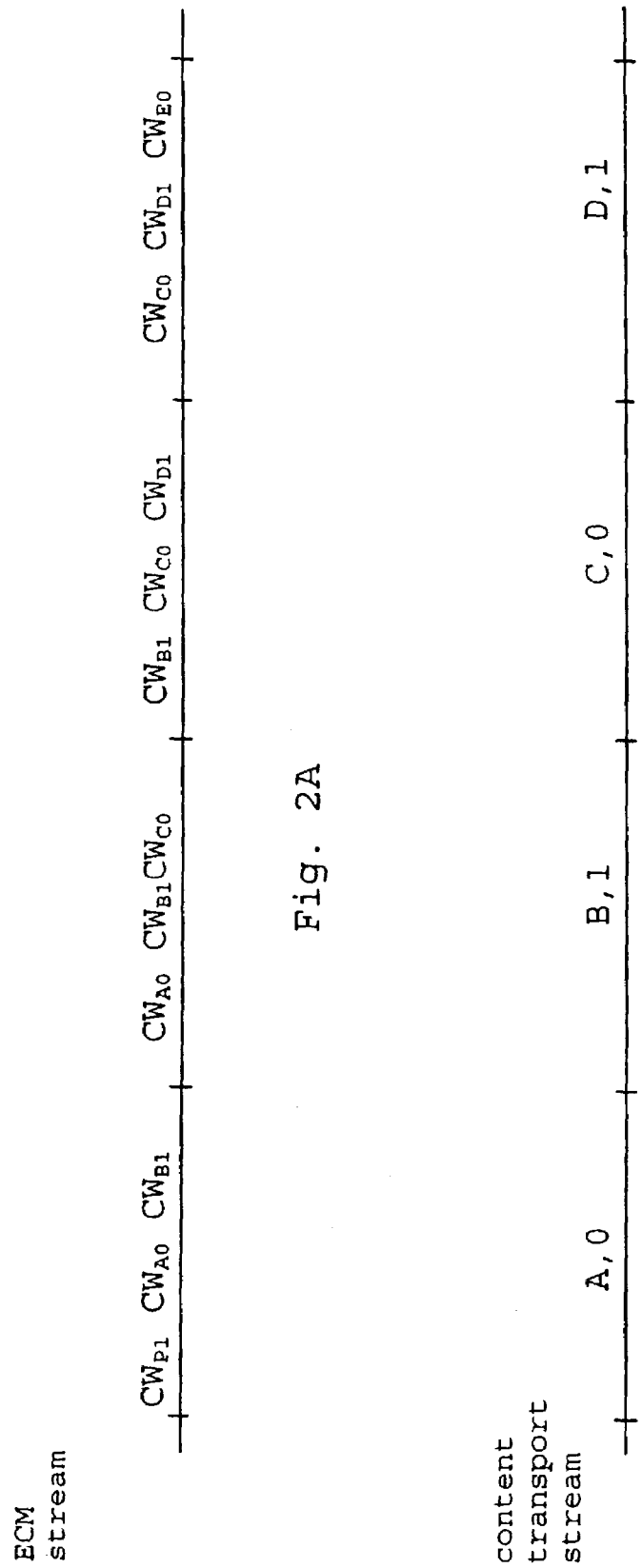

SYSTEM FOR PROVIDING SCRAMBLED CONTENT, AND SYSTEM FOR DESCRAMBLING SCRAMBLED CONTENT

CROSS-REFERENCE TO OTHER APPLICATIONS

This Application is a National Phase of International Application No. PCT/EP01/03186, filed on Mar. 21, 2001, which claims priority from European Patent Office Patent Application No. 00201277.1, filed on Apr. 7, 2000.

The invention relates to conditional access systems suitable for receiving apparatus provided with storage devices with large capacity. The invention specifically relates to a system for providing scrambled content according to the preamble of claim 1 and to a system for descrambling scrambled content according to the preamble of claim 3.

Recently television receiving apparatus have been equipped with storage devices with large capacity allowing the users to store hours of video content. In this manner the user can create a "personal television" recording his favourite programs and the like. Such receiving apparatus can be made as a television apparatus, a set-top box or the like.

The content stored in the storage devices, such as large hard discs, can include scrambled content with conditional access, wherein control words are needed to descramble the content. Such storage devices allow going backwards through the scrambled content, wherein however the presently available mechanisms for cycling control words become difficult to use. Going backwards is necessary as the users would like to use a VCR-like rewind functionality. However the current techniques used for control word cycling are designed for signals that go forward only.

The invention aims to provide a system for providing scrambled content and a system for descrambling scrambled content of the above-mentioned type, wherein a VCR-like rewind function is supported.

According to the invention a system for providing scrambled content, comprises a control word generator, each control word including a control word identifier, a scrambler for providing a stream of scrambled data packets, wherein one or more consecutive packets are scrambled using the same control word (CW) and wherein each packet includes a control word identifier identifying the control word used, and an encryption device for providing entitlement control messages (ECM's), each ECM including at least a next control word ($CW_N$), characterized in that the ECM encryption device provides ECM's including a previous control word ($CW_P$), a current control word ($CW_C$) and a next control word ($CW_N$).

In a second aspect of the invention a system for descrambling scrambled content is provided, comprising a descrambler for descrambling the scrambled content, a decryption device for decrypting ECM's to obtain control words, wherein the ECM decryption device delivers control words to the descrambler, wherein the descrambler descrambles the data packets of the scrambled content using a control word having a control word identifier corresponding with the control word identifier of the data packet to be descrambled, the system further comprising a storage device for storing scrambled content and a processing unit with means to control playback of the stored content, going fast forward and going backwards, wherein the processing unit is programmed to extract ECM's and to provide the ECM's to the ECM decryption device for decryption, characterized in that the processing unit is programmed to request the ECM decryption device to provide at least a next control word ($CW_N$) at play back or going fast forward, and to provide at least a previous control word ($CW_P$) and a current control word ($CW_C$) at going backwards.

By providing entitlement control messages with three control words, i.e. the current, next and previous control words, the receiving apparatus can playback stored content from disc in a normal manner, wherein further fast forward and rewind functions are available. When the receiving apparatus is going backwards through the content, the processing unit picks up the first ECM it finds, sends the ECM to the ECM decryption device and requests the decryption device to deliver current and previous keys and loads these keys into the descrambler. Processing the ECM's and synchronizing the provision of control words is relatively simple in this manner.

The invention will be further explained by reference to the drawings in which an embodiment of the systems of the invention is shown.

FIGS. 2A and 2B show diagrams to explain the operation of the systems of the invention.

Figure 1B:
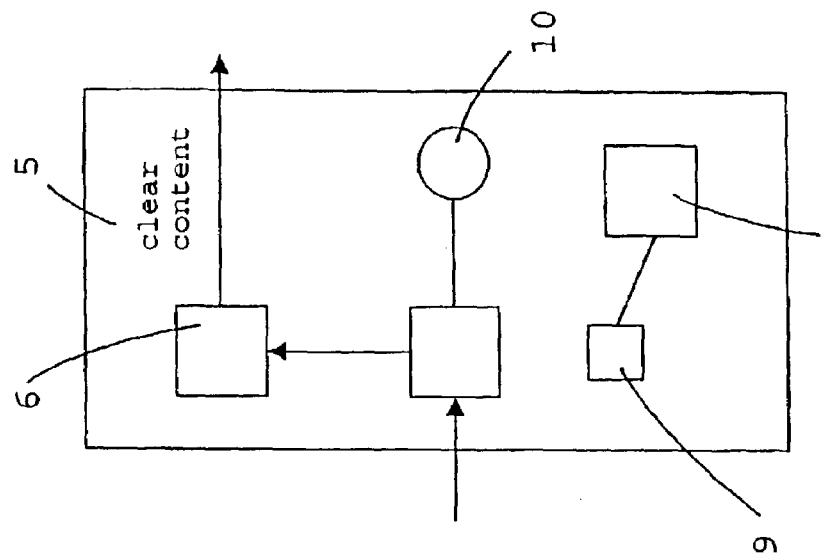
FIGS. 1A and 1B show simplified diagrams of embodiments of the systems for providing scrambled content, and descrambling scrambled content according to the invention.
Figure 1A:
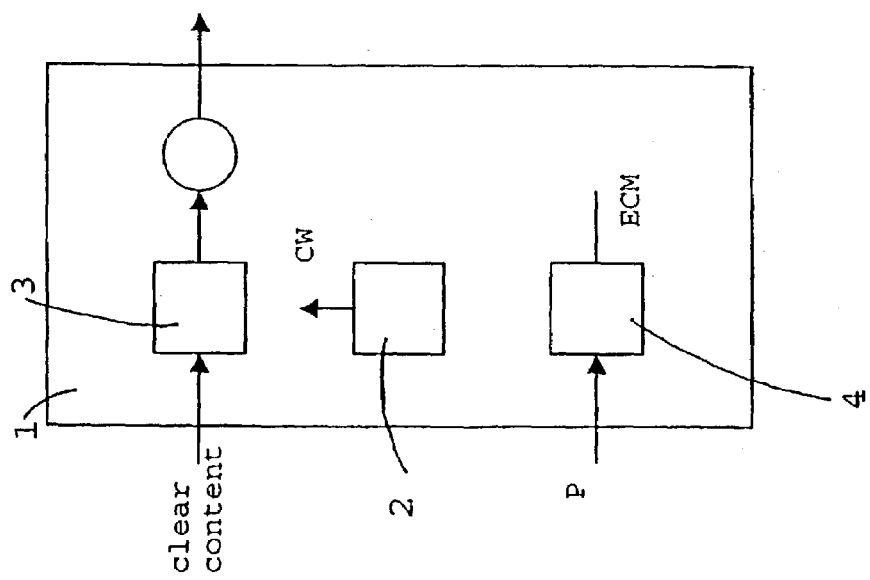

FIG. 1 shows a system 1 for providing scrambled content comprising a control word generator 2 and a scrambler 3. The scrambler 3 receives clear content and delivers content scrambled using the control words provided by the control word generator 2 as encryption keys. The control word generator provides a new control word every ten seconds for example. As is well-known in the art, the control words are generally used as a seed for a pseudo-random binary sequence generator, wherein the output of the PRBS generator is used for scrambling the clear content. Of course other scramble systems such as a block cypher system may also be used. As such scrambling systems are known per se, this is not discussed in detail in this specification as it is not part of the present invention. Each control word CW has an associated control word identifier, which in case of the generally used MPEG system is only one bit, i.e. either a zero or a one. In a corresponding manner the same control word identifier, i.e. a zero or a one, is associated with each scrambled data packet or plurality of scrambled data packets scrambled under the control of the control word having the same associated identifier zero or one.

The control words $CW_0$ and $CW_1$ are also delivered to an ECM encryption device 4 which encrypts the control words using an input key P. The encryption device 4 can be made as a smart card. The encrypted ECM's with the control words are inserted into the scrambled content and broadcasted or delivered in any other manner to a number of subscribers each having a system 5 for descrambling scrambled content.

It is noted that the key P used by the encryption device 4 can be transferred to the systems 5 in so-called entitlement management messages which are not shown in FIG. 1. Conditional access systems operating with such a hierarchy of keys are known per se and are not further described in this specification.

The descrambling system 5 comprises a descrambler 6 for descrambling the scrambled content and a decryption device 7 for decrypting ECM's to obtain the control words CW. This device 7 can be made as a smart card. Further, the system 5 comprises a processing unit 8 controlling the operation of the system and having a schematically indicated control means 9 allowing control of the system by the user. The scrambled content is received by the processing unit 8 and can be stored on a storage device 10, for example a hard disc with large capacity. The processing unit 8 forwards the scrambled content to the descrambler 6 and extracts the ECM's from the stream and forwards the ECM's to the decryption device 7. The decryption device 7, generally made as a secure device such as a smart card, decrypts the ECM's received and as controlled by the processing unit 8 delivers the control words $CW_0$, $CW_1$ to the descrambler 6. If a data packet with the control word identifier 0 is received the control word $CW_0$ is used, if a data packet having the control word identifier 1 is received, the control word $CW_1$ is used.

In the known conditional access system either the current control word $CW_C$ and the next control word $CW_N$ is included in the ECM's or only the next control word $CW_N$. The decryption device 7 decrypts the control words and loads the control words into the descrambler 6. As stated above, the data packets passing the descrambler 6 have corresponding control word identifiers indicating which control word $CW_1$ or $CW_0$ to use. In normal use, when only going forward, an ECM is extracted from the stream and will at least contain the control word $CW_1$ or $CW_0$ to be used at the next transition from identifier 1 to 0 in the data packet stream. However when going backwards through the data stream, the ECM at any location will not have the control word $CW_P$ for the previous data packet. This means that the processing unit 8 must look further back then the current data packet being processed by the descrambler in order to find a previous ECM. This would require an intensive operation and would mean a high load on the processing capacity of the system 5.

According to the invention, this problem of locating an ECM in the data stream is avoided by including in the ECM's three keys, i.e. the previous control word $CW_P$, the current control word $CW_C$ and the next control word $CW_N$. In this manner each ECM extracted from the stream by the processing unit 8 at play back of the content stored on the disc 10 contains three control words, including the control word required for descrambling the previous data packet. In this manner a rewind function is supported in an easy manner so that the user can scroll back through the content retrieved from the storage device 10 using the control means 9. Of course, such control means may include a remote control device.

An illustration of the operation of the systems of the invention is schematically shown in FIG. 2. A content stream with data packets A, B, C and D is shown, wherein it is assumed that data packet A has the control word identifier 0, the data packet B the identifier 1, the data packet C the identifier 0 etc. The ECM stream is shown above the data packet stream. As indicated, a new ECM is extracted from the stream shortly before a transition from data packet A to B, from B to C etc. The ECM extracted from the data stream shortly before the beginning of data packet A, includes the previous control word $CW_{P1}$, the current control word $CW_{A0}$, and the next control word $CW_{B1}$. The next ECM includes the previous control word $CW_{A0}$, the current control word $CW_{B1}$ and the next control word $CW_{C0}$. During normal playback, the processing unit 8 will extract the ECM's subsequently from the data stream and will send the ECM's to the decryption device 7. The processing unit 8 will request the decryption device 7 to send the current control word $CW_{A0}$ and the next control word $CW_{B1}$ to the descrambler 6. The descrambler 6 receiving the data packet A with identifier 0, will use the control word $CW_{A0}$ to descramble this data packet. At the transition from data packet A to data packet B, the new identifier 1 indicates the descrambler 6 to use the control word $CW_{B1}$. The same operation applies to the fast forward mode wherein the processing unit 8 will request the decryption device 7 to send the current and next control words to the descrambler 6.

If the user operates the control means 9 for going backwards, i.e. a VCR-like rewind function, the processing unit 8 instructs the decryption device 7 to provide the current control word $CW_{A0}$ and previous control word $CW_{P1}$. In this manner the descrambler 6 can descramble the previous data packet.

In the above example it is indicated that the ECM's are stored as part of the content. It is also possible to store the ECM's separately with timing information. In this case timing information in the content stream is used by the processing unit 8 to extract or retrieve the correct ECM's from the storage device 10.

From the above it will be understood that the invention provides systems, wherein going backwards through the stored video content is allowed without any significant increase in the load on the processing unit in processing ECM's and synchronizing control words. It will be clear that the invention can be used with any type of video or audio content.

The invention is not restricted to the above described embodiments which can be varied in a number of ways within the scope of the attached claims.

The invention claimed is:

1. System for descrambling scrambled content, comprising a descrambler for descrambling the scrambled content, a decryption device for decrypting ECM's to obtain control words, wherein the ECM decryption device delivers control words to the descrambler, wherein the descrambler descrambles the data packets of the scrambled content using a control word having a control word identifier corresponding with the control word identifier of the data packet to be descrambled, the system further comprising a storage device for storing scrambled content and a processing unit with means to control play back of the stored content, going fast forward and going backwards, wherein the processing unit is programmed to extract ECM's and to provide the ECM's to the ECM decryption device for decryption, characterized in that the processing unit is programmed to request the ECM decryption device to provide at least a next control word ($CW_N$) at play back or going fast forward, and to provide at least a previous control word ($CW_P$) and a current control word ($CW_C$) at going backwards.

2. System according to claim 1, wherein the processing unit is programmed to request the ECM decryption device to provide the current control word ($CW_C$) together with a next control word ($CW_N$) at playback or going fast forward and to provide the current control word ($CW_C$) together with a previous control word ($CW_P$) at going backwards.

3. System according to claim 1, wherein the ECM decryption device is accommodated in a smart card.

* * * * *